US007665754B2

(12) United States Patent
Mitchell

(10) Patent No.: US 7,665,754 B2
(45) Date of Patent: Feb. 23, 2010

(54) PROPULSION UNIT FOR WHEELCHAIRS

(76) Inventor: Raymond Larry Mitchell, 7135 Alexandra Street, Montreal, Quebec (CA) H2S 3J6

( * ) Notice: Subject to any disclaimer, the term of this patent is extended or adjusted under 35 U.S.C. 154(b) by 525 days.

(21) Appl. No.: 11/445,366

(22) Filed: Jun. 2, 2006

(65) Prior Publication Data

US 2006/0261571 A1 Nov. 23, 2006

Related U.S. Application Data

(63) Continuation-in-part of application No. 11/126,185, filed on May 11, 2005, now abandoned.

(60) Provisional application No. 60/569,759, filed on May 11, 2004, provisional application No. 60/629,705, filed on Nov. 22, 2004.

(51) Int. Cl.
*B62M 1/14* (2006.01)

(52) U.S. Cl. ..................................................... 280/250.1

(58) Field of Classification Search ............... 280/250.1
See application file for complete search history.

(56) References Cited

U.S. PATENT DOCUMENTS

| | | | | | |
|---|---|---|---|---|---|
| 4,834,413 | A | * | 5/1989 | Patel et al. | 280/304.1 |
| 5,984,334 | A | * | 11/1999 | Dugas | 280/250.1 |
| 6,443,252 | B1 | * | 9/2002 | Andes | 180/65.1 |
| 7,341,267 | B2 | * | 3/2008 | Vroom | 280/250 |
| 2002/0043781 | A1 | * | 4/2002 | Mitchell | 280/250.1 |

* cited by examiner

*Primary Examiner*—Lesley Morris
*Assistant Examiner*—Jacob Knutson
(74) *Attorney, Agent, or Firm*—Ogilvy Renault LLP

(57) ABSTRACT

A propulsion unit for a wheelchair wheel with a track. The propulsion unit comprising a body having a front portion, a rear portion and a handle, at least three rollers pivotally mounted to the body, front and rear friction elements positioned in the front and rear portions of the body respectively. When the handle is pressed forward the wheel is propelled forward and when the handle is pressed rearward the wheel is propelled rearward.

26 Claims, 11 Drawing Sheets

PROPULSION UNIT FOR WHEELCHAIRS

RELATED APPLICATION(S)

This application is a continuation-in-part of U.S. patent application Ser. No. 11/126,185 filed on May 11, 2005, now abandoned which claims the benefit of U.S. Provisional Patent Application No. 60/569,759, filed May 11, 2004, and claims benefit of U.S. Provisional Patent Application No. 60/629,705, filed Nov. 22, 2004.

BACKGROUND OF THE INVENTION

1. Field of the Invention

The present invention relates to a propulsion unit for a wheelchair, and more particularly to a propulsion unit mounted on a track for a wheelchair wheel.

2. Description of the Prior Art

Many older people develop physical handicaps at a late stage in their lives requiring that they adapt themselves to the confines of a wheelchair and learn how to propel and navigate the wheelchair. Manual wheelchairs are very difficult to propel as strength and dexterity are required to grasp and rotate the cold metal handrails.

Thus, it is common for wheelchair users of all ages to experience upper limb pain and pathology due to the requirements placed on the arms for wheelchair locomotion. As a result of greater than normal usage of the upper limbs, proper propulsion mechanics are paramount in preventing injuries.

Several hand propulsion devices have been developed for conventional wheelchairs to increase the mechanical advantage and thereby reduce the force that such occupants must exert to propel a wheelchair. However, the relatively complicated manipulations required to operate the prior art devices deters from their use.

In most all prior art hand propulsion devices, the installation of such devices requires alterations to the wheelchair. Few if any prior art devices can be easily retrofitted to existing wheelchairs without the need for modifying the latter.

Furthermore, there are no prior art hand propulsion devices that offer the versatility of being compatible with wheelchairs of varying wheel diameters. In many prior art cases, the propulsion device is mounted to the axle of the wheelchair; and therefore must be available in different lengths as not all wheelchairs have wheels of the same diameter.

Therefore, there is a need for a propulsion device for wheelchairs that at least addresses some of the above-stated issues.

SUMMARY OF THE INVENTION

It is therefore an aim of the present invention to provide a propulsion unit that is meant to ease the effort required to propel a manual wheelchair.

It is also an aim of the present invention to provide a propulsion unit adaptable for use with conventional wheelchairs.

Therefore, in accordance with one aspect of the present invention, there is provided a propulsion unit for a wheelchair wherein the wheelchair has a frame with a pair of large diameter wheels and a track having an outer surface and an inner surface, the propulsion unit comprising: a body having a front portion, a rear portion and a handle; at least three rollers pivotally mounted to the body, two of the at least three rollers being spring biased and adapted to be mounted in contact with one of the inner and outer surfaces of the track, the remaining of the at least three rollers adapted to be mounted in contact with the other of the inner and outer surfaces of the track; front and rear friction elements positioned in said front and rear portions of the body respectively, said front friction element adapted to engage the track when a forward pressure is applied to the handle rocking the body forward, the rear friction element adapted to engage the track when a rearward pressure is applied to the handle rocking the body rearward; and wherein when the handle is pressed forward the wheel is propelled forward and when the handle is pressed rearward the wheel is propelled rearward.

Therefore, in accordance with another aspect of the present invention, there is provided in combination a propulsion unit and a track for a wheelchair wherein the wheelchair has a frame with a pair of large diameter wheels, the track comprising an outer surface and an inner surface and adapted to be fixed to one of the wheels and the propulsion unit grippingly engaged with the track. The propulsion unit comprising a body having a front portion, a rear portion and a handle, at least three rollers pivotally mounted to the body, two of the at least three rollers being spring biased and mounted in contact with one of the inner and outer surfaces of the track, the remaining of the at least three rollers mounted in contact with the other of the inner and outer surfaces of the track, front and rear friction elements positioned in the front and rear portions of the body respectively, the front friction elements engaging the track when a forward pressure is applied to the handle rocking the body forward, the rear friction element engaging the track when a rearward pressure is applied to the handle rocking the body rearward, and wherein when the handle is pressed forward the wheel is propelled forward and when the handle is pressed rearward the wheel is propelled rearward.

The term "track" is used to define different embodiments including a handrail having a circular cross section of the type commonly found on manual wheelchairs and a flange adapted to replace a conventional handrail by being integrally moulded with a wheel of a wheelchair or retrofitted thereto.

BRIEF DESCRIPTION OF THE DRAWINGS

Reference will now be made to the accompanying drawings, showing by way of illustration a preferred embodiment thereof, and in which.

DESCRIPTION OF THE PREFERRED EMBODIMENTS

Figure 1:
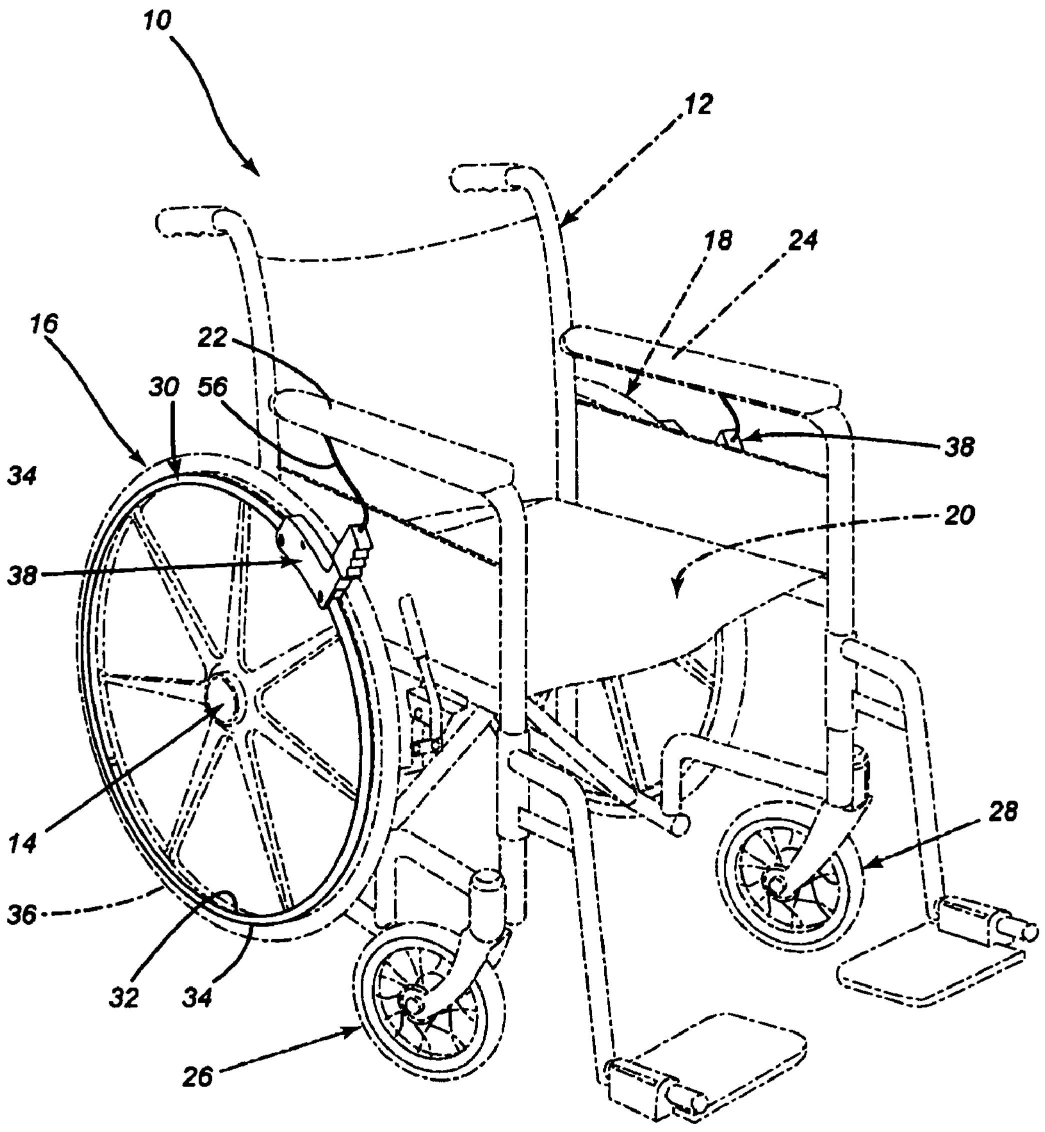
FIG. 1 is a perspective view of a manual wheelchair with a propulsion unit mounted on a handrail thereof in accordance with a first particular embodiment of the present invention.

Referring to FIG. 1, in a first particular embodiment of the present invention there is shown a manual wheelchair 10 having a frame 12, and axles 14 extending on either side of the frame 12 defining an axial direction. Large diameter wheels 16 and 18 are mounted on axles 14. The frame 12 includes a seat 20 with arm rests 22 and 24 and small caster wheels 30 and 28 located on the front end thereof. The large wheels 16 and 18 both mount a handrail with a circular cross-section 30 having an inner and an outer surface 32 and 34 respectively and a peripheral rubber tire 36. A propulsion unit 38 is provided for each wheel 16, 18 of the wheelchair 10. Since both sides of the wheelchair 10 are mirror images, only wheel 16 with propulsion unit 38 mounted thereon will be further described.

Generally, the propulsion unit 38 is adapted for mating engagement with a track. In the present particular embodiment the handrail 30 is used as a track for mounting the propulsion unit 38. Advantageously, the propulsion unit 38 is designed to be retrofitted to any conventional wheelchair with a handrail and is adaptable to different wheel diameters.

Figure 2:
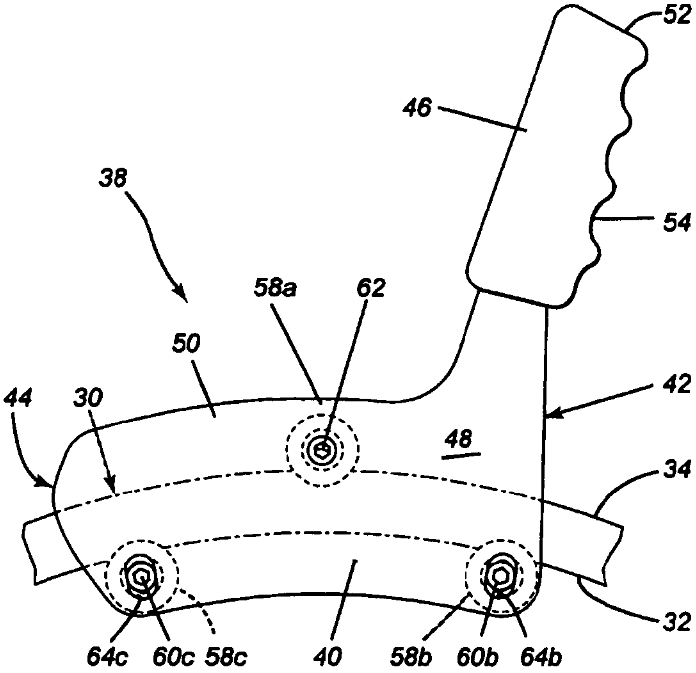
FIG. 2 is a side elevational view of the propulsion unit of FIG. 1, mounted on a fragment of the handrail with rollers.
Figure 3:
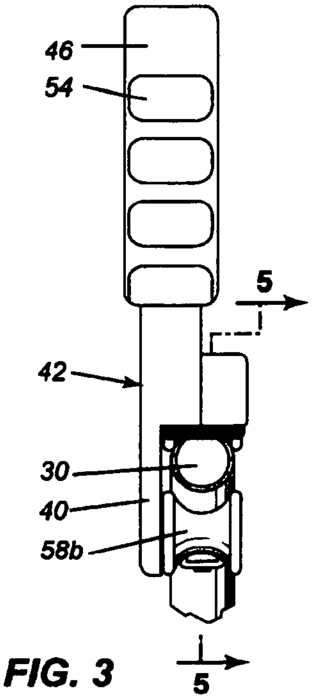
FIG. 3 is a front elevational view of the propulsion unit of FIG. 1, mounted on a fragment of the handrail.

Referring concurrently to FIGS. 2 to 6, it can be seen that the propulsion unit 38 comprises a body 40 having a front portion 42, a rear portion 44 and a handle 46. The handle 46 is preferably disposed in the front portion 42 thereof. In this exemplary embodiment the body 40 has a side portion 48 extending in a plane perpendicular to the axial direction of wheel 16 and a top portion 50 projecting out from the side portion 48, in an axial direction, adapted to extend over the outer surface 34 of the handrail 30. As can be seen in FIG. 3, the side portion 48 has a rounded parallelogram shape. The top portion 50 is preferably rounded so as to better contour the handrail 30 of the wheel 16. Extending from the front portion 42 of the body 40, in a radial direction, is the handle 46. More specifically, the handle 46 extends outwardly away from the top portion 50 of the body 40. The handle 46 has a top end 52 and a finger gripping portion 54 adjacent thereto. Preferably the finger gripping portion 54 is provided in the form of a soft material covering. Notably, the finger gripping portion 54 may be integral to the handle 46.

Now referring back to FIG. 1, it can be seen that a bungee cord 56 extends from the top end 52 of the handle 46 and attaches to arm rest 22 adjacent wheel 16 of the wheelchair 10. The bungee cord 56, acting as a linking piece, advantageously maintains the propulsion unit 38 in an easy to reach position, preventing the propulsion unit 38 from rolling forward or rearward off the top of the wheel 16 towards the ground. The bungee cord 56 limits the movement of the propulsion unit 38 to a sector of the circumference of the wheel 16 located at the top thereof, so that an individual seated in seat 20 of the wheelchair 10 can easily reach the handle 46 of the propulsion unit 38. It should be understood that other suitable linking piece for achieving substantially the same result fall within the scope of the present invention.

Referring to FIGS. 2 to 6, the propulsion unit 38 also comprises at least three rollers, designated by reference numerals 58*a*, 58*b* & 58*c*, that are pivotally mounted to the body 40. Two of the three rollers, particularly 58*b* and 58*c*, are spring biased and adapted to be mounted in contact with the inner surface 32 of the handrail 30. The remaining roller, specifically 58*a* in this embodiment, is adapted to be mounted in contact with the outer surface 34 of the handrail 30. The rollers 58 have a concave body section shaped to marry the roundness of the handrail 30 as is best shown in FIG. 3 thereby allowing the handrail 30 to act as a track. The rollers 58 are adapted to grasp onto the handrail 30 thereby maintaining the propulsion unit 38 in an upright ready to use position with the handle 46 extending outwardly in the radial direction.

Figure 4:
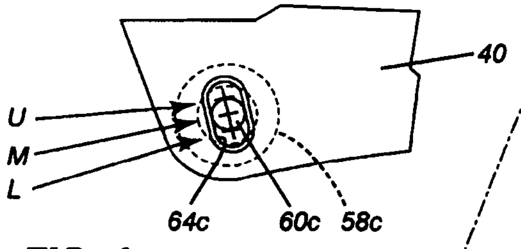
FIG. 4 is an enlarged sectional view of a portion of the propulsion unit of FIG. 2, showing one of the rollers.

Referring now to FIGS. 2 and 4, the rollers 58 are triangularly oriented when viewed in the axial direction (FIG. 2). Specifically, roller 58*b* is situated in the front portion 42 of the body 40, roller 58*c* is situated in the rear portion 44 of the body 40 and roller 58*a* is situated inbetween. In the present exemplary embodiment the rollers 58*a, b* and *c* are pivotally attached to the side portion 48 of the body 40 by way of axle bolts 60*a, b* and *c* respectively. Roller 58*a* is fixedly attached to the side portion 48 by axle bolt 60*a*, thus defining a pivot point 62 about which the body 40 rotates. Axle bolts 60*b* and *c* are received through oblong slots 64*b* and *c* respectively defined in the side portion 48 of the body 40. Therefore, the axle bolts 60*b* and *c* are able to move within the oblong slots 64*b* and *c* allowing for the rollers 58 *b* and *c* to be displaced accordingly. When the propulsion unit 38 mounted to the handrail 30 is viewed in the axial direction, the oblong slots 64 *b* and *c* are longitudinally oriented in the radial direction with respect to the axis of rotation of the wheel 16.

FIG. 4 is an enlarged view showing the movement of axle bolt 60*c* and roller 58*c* in oblong slot 64*c*. Three axle positions are defined: a median or neutral position M with the center of the axle bolt 60*c* in line with the center of the oblong slot 64*c* as shown in FIG. 4, an upper position U where the center of the axle bolt 60*c* is above the center of the oblong slot 64*c* and a lower position L where the center line of the axle bolt 60*c* is below the center of the oblong slot 64*c*.

Figure 5:
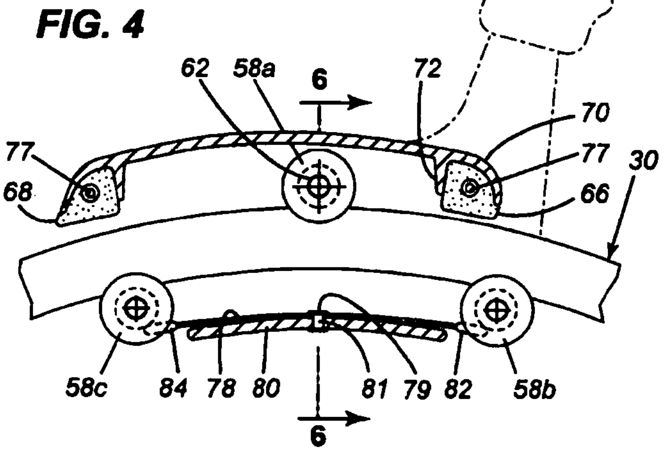
FIG. 5 is a partial cross-sectional view taken along lines 5-5 of FIG. 3.

FIG. 5 shows the propulsion unit 38 further comprising front and rear friction elements 66 and 68 positioned in the front and rear portions 42 and 44 of the body 40 respectively. The front and rear friction elements 66 and 68 are preferably elastomeric pads. Specifically, the front friction element 66 is mounted adjacent the top portion 50 of the body 40, disposed between a curved front corner 70 thereof and a downwardly projecting front flange 72. The front friction element 66 extends from the top portion 50 of the body 40 towards the outer surface 34 of the handrail 30 such that the curved front corner 70 and the flange 72 are in contact with approximately ⅔ of the height thereof. Similarly, the rear friction element 68 is mounted between a curved rear corner 74 of the top portion 50 of the body 40 and a downwardly projecting rear flange 76. The front and rear friction elements 66 and 68 are preferably fixed to the body 40 by bolts 77. Still other suitable attachment means may be used.

In use, the friction elements 66 and 68 are adapted to grip to the track on which the propulsion unit 38 is rollably engaged with when the handle 46 is rocked forward or rearward. In this case, the track is provided as the handrail 30. Thus, the force applied to the handle 46 is imparted to the handrail 30 which is fixedly attached to the wheel 16 thereby propelling the latter either forward or rearward.

Figure 6:
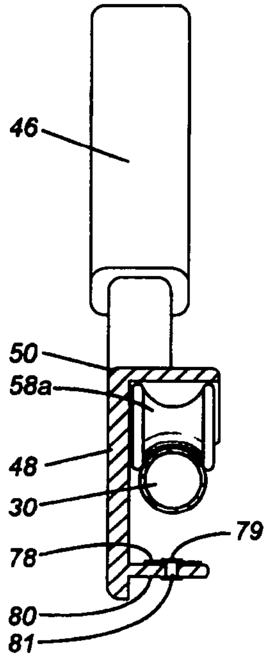
FIG. 6 is a partial cross-sectional view taken along lines 6-6 of FIG. 5.

Still referring to FIG. 5, the propulsion unit 38 comprises a spring 78 or a biasing member biasing rollers 58*b*& *c* against the handrail 30. The spring is preferably a leaf spring 78 in contact with rollers 58*b* & c extending therebetween from the front portion 42 of the body 40 to the rear portion 44. The spring 78 is attached to a thin wall 80 protruding horizontally, or in the axial direction, from the side portion 48 of the body 40. The thin wall 80 is adapted to extend below the handrail 30 as illustrated in FIG. 6. Specifically, the spring 78 lies over the thin wall 80 and is riveted thereto by rivet 79. It should be noted that the spring 78 is fixed at a halfway spring attachment point 81 between the rollers 58*b* and *c* in line with the pivot point 62.

Figure 7:
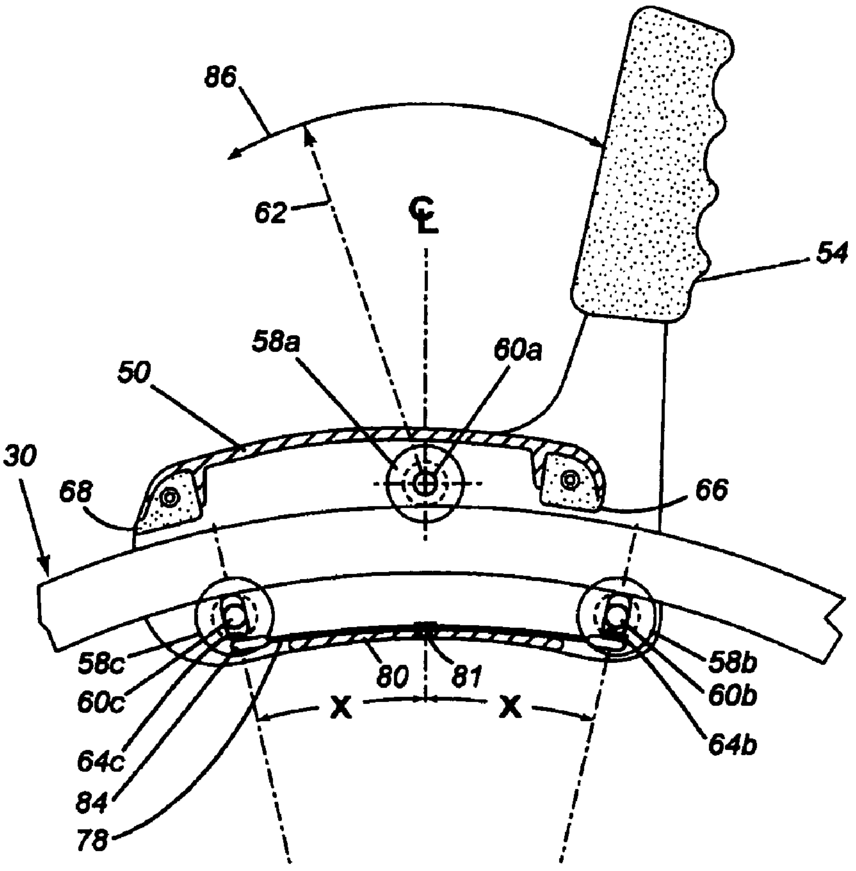
FIG. 7 is a side elevational view, partly sectioned, of the propulsion unit of FIG. 1, showing the position of the rollers with respect to a center line.

FIG. 7 shows a centerline, designated by CL, passing through the pivot point 62 and the spring attachment point 81 and radiating through the center of the wheel 16. The distances designated X in FIG. 7 illustrated the triangulation desired of the three rollers 58. Notably, distances X between rollers 58*b* and *c* and the centerline CL are equal.

Figure 8:
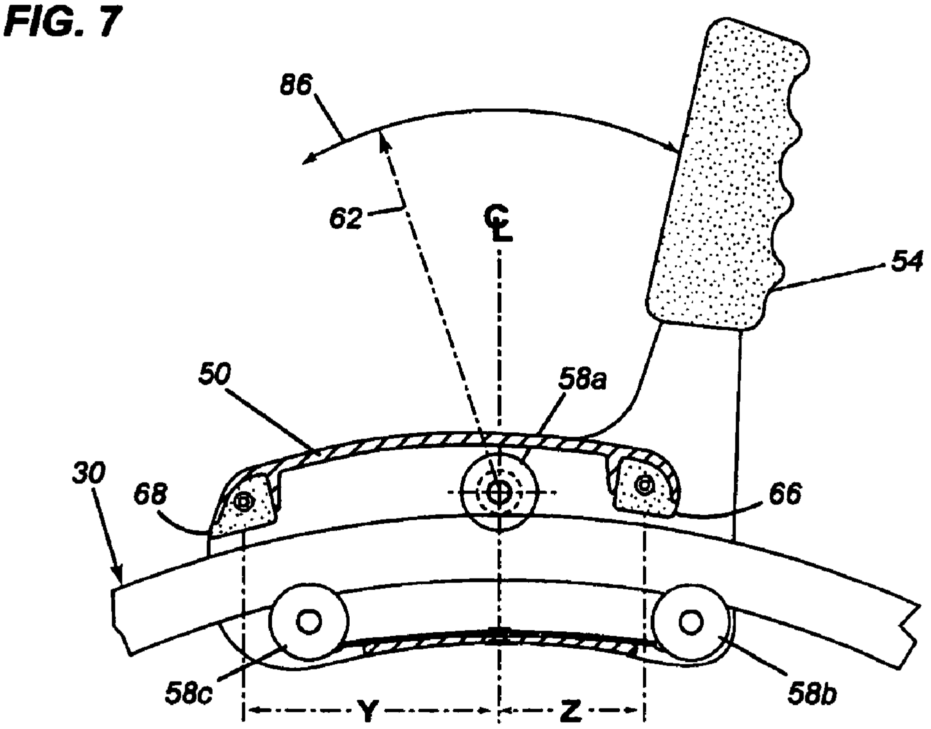
FIG. 8 is a side elevational view, partly sectioned, of the propulsion unit of FIG. 1, showing the position of friction elements with respect to a center line.

FIG. 8 shows distance Y between the rear friction element 68 and centerline CL and distance Z between the front friction element 66 and centerline CL. It can be seen that distance Y is greater than distance Z so as to allow the front friction element 66 to engage the handrail 30 with less effort than the reverse action. This is because the shorter the response time before the friction element makes contact with the handrail 30, the less effort is required. This is desirable because the user of the wheelchair 10 generally requires to move forward most of the time. Furthermore, it is also desirable to avoid accidentally making the rear friction element 68 contact the handrail 30. Thus, the off-set friction element configuration as illustrated in FIG. 8 helps reduce the likelihood that a user of the propulsion unit 38 will engage the rear friction element 68 with the handrail 30.

Referring to FIG. 7, the spring 78 has a front end plastic tip 82 and a rear end plastic tip 84 shaped to marry the concave curvature of rollers 58*b* and *c* respectively. The spring 78 with plastic tips 82 and 84 contacts the rollers 58*b* and *c* at the periphery of the narrowest portion thereof: the center of the concave curvature 85. The spring 78 urges the rollers 58*b* and *c* to make contact with the inner surface 32 of the handrail 30.

The role of each component of the propulsion unit 38 will now be clarified with reference to FIGS. 7 and 8. The push/pull action by a user on handle 46 is shown by reference numeral 86. The push/pull action 86 causes the propulsion unit 38 to rotate about pivot point 62. This rocking motion is the basic principle in propelling the wheelchair 10.

Thus, pressing the handle 46 forward causes the body 40 to rock forward which in turn causes the front friction element 66 to engage the outer surface 34 of the handrail 30. Once the front friction element 66 is in engagement with the outer surface 34 of the handrail 30, a pushing action 86 will be directly transmitted to the wheel 16 causing it to move forward. More specifically, the rotation of body 40, of the propulsion unit 38, about pivot point 62, causes axle bolt 60*b* and roller 58*b* to push down upon the front end plastic tip 84 of the spring 78. The spring 78 flexes against the pressure applied and allows the axle bolt 60*b* to move into the lower position L within the oblong slot 64*b*. As a result, the axle bolt 60*c* and roller 58*c* are caused to move up, the former in the upper position U in the oblong slot 64*c* and the latter against the inner surface 32 of the handrail 30. Therefore, as the handle 46 is pushed forward, the body 40 pivots forward such that the axle bolts 60*b* and *c* are displaced in opposite directions in the oblong slots 64*b* and *c* with roller 58*b* moving away from the handrail 30 and roller 58*c* moving towards the handrail 30. When the handle 46 is pressed forward with the front friction element 66 engaged to the handrail 30, the wheel 16 is propelled forwardly.

Similarly, pressing or pulling the handle 46 rearwardly causes the body 40 to rock back which in turn causes the rear friction element 68 to engage the outer surface 34 of the handrail 30. Once the rear friction element 68 is in engagement with the outer surface 34 of the handrail 30, a pulling action 86 can be directly transmitted to the wheel 16 to cause it to move rearward. In such a case, the axle bolts 60*b* and *c* and rollers 58*b* and *c* have the exact opposite reaction to the reaction described above. Therefore, when the handle 46 is pressed rearward with the rear friction element 68 engaged to the handrail 30, the wheel 16 is propelled rearwardly.

When no pressure is applied to the handle 46, the spring 78 maintains an upward pressure on rollers 58*b* and *c* thereby maintaining the front and rear friction elements 66 and 68 away from the handrail 30. Thus, the axle bolts 60*b* and *c* are maintained in the median or neutral position M (FIG. 4). Advantageously, this allows for the wheelchair 10 to be pushed from behind without engaging the propulsion unit 38.

Now referring to FIGS. 9 through 15, a second particular embodiment is shown. The reference numerals used for various elements in the second particular embodiment correspond to the reference numerals utilized in the first embodiment but have been raised by 100. Only the aspects of this embodiment that differ from the first embodiment will be described.

Figure 9:
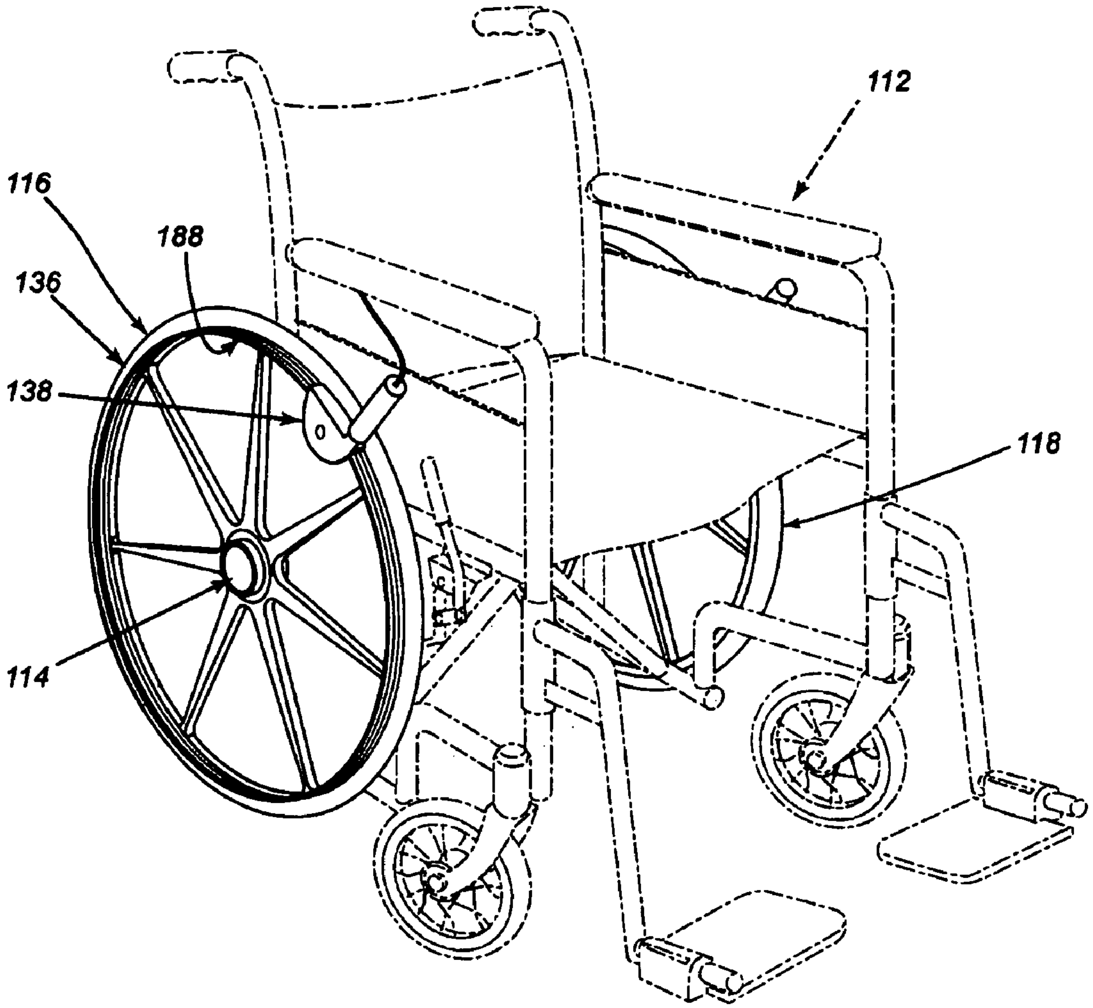
FIG. 9 is a perspective view of a manual wheelchair with a propulsion unit mounted on a flange thereof in accordance with a second particular embodiment of the present invention.

Referring to FIG. 9 there is shown a manual wheelchair 110 having a frame 112, and axles 114 extending on either side of the frame 112 defining an axial direction. Large diameter wheels 116 and 118 are mounted on axles 14. The large wheels 116 and 118 both mount a flange 188 having an inner and an outer surface 132 and 134 respectively and being disposed adjacent a peripheral rubber tire 136. A propulsion unit 138 is provided for each wheel 116, 118 of the wheelchair 110. In this particular embodiment the flange 188 is used as a track for mating engagement with the propulsion unit 138.

Since both sides of the wheelchair 110 are mirror images, only wheel 116 with propulsion unit 138 mounted thereon will be further described.

FIGS. 10 through 13 illustrate the flange 188 having grooves 190 and 192 in both the inner and outer surfaces 132 and 134 respectively. The flange 188 is preferably moulded onto the circumference of the wheel frame. In this embodiment, the front and rear friction elements 166 and 168 and the rollers 158 both have a convex curvature for mating with the grooves 190 and 192 thereby allowing the flange 188 to act as a track. The rollers 158 also have a different position. In the present particular embodiment, roller 158*a* is adapted to be mounted in contact with the inner surface 132 of the flange 188. Roller 158*a* is fixedly attached to the body 140 and acts as a pivot point 162 about which the propulsion unit 138 pivots.

In this embodiment, rollers 158*b* and *c* are mounted to a spring-loaded carriage 194. The spring-loaded carriage 194 comprises a leaf spring 178 that urges the rollers 158*b* and *c* against the flange 188. As can be best seen in FIGS. 14 and 15, the spring-loaded carriage 194 further comprises a pair of side walls 196 at each end thereof between which are mounted rollers 158*b* and *c* respectively. The rollers 158*b* and *c* are mounted by way of axle bolts 160*b* and *c*. The spring loaded carriage 194 is fixed, by way of riveting or the like, to the top portion 150 of the body 140. In this embodiment a rivet 198 bisects the spring-loaded carriage 194, attaching it to the body 140 at a point along the centerline CL radiating through pivot point 162.

Figure 10:
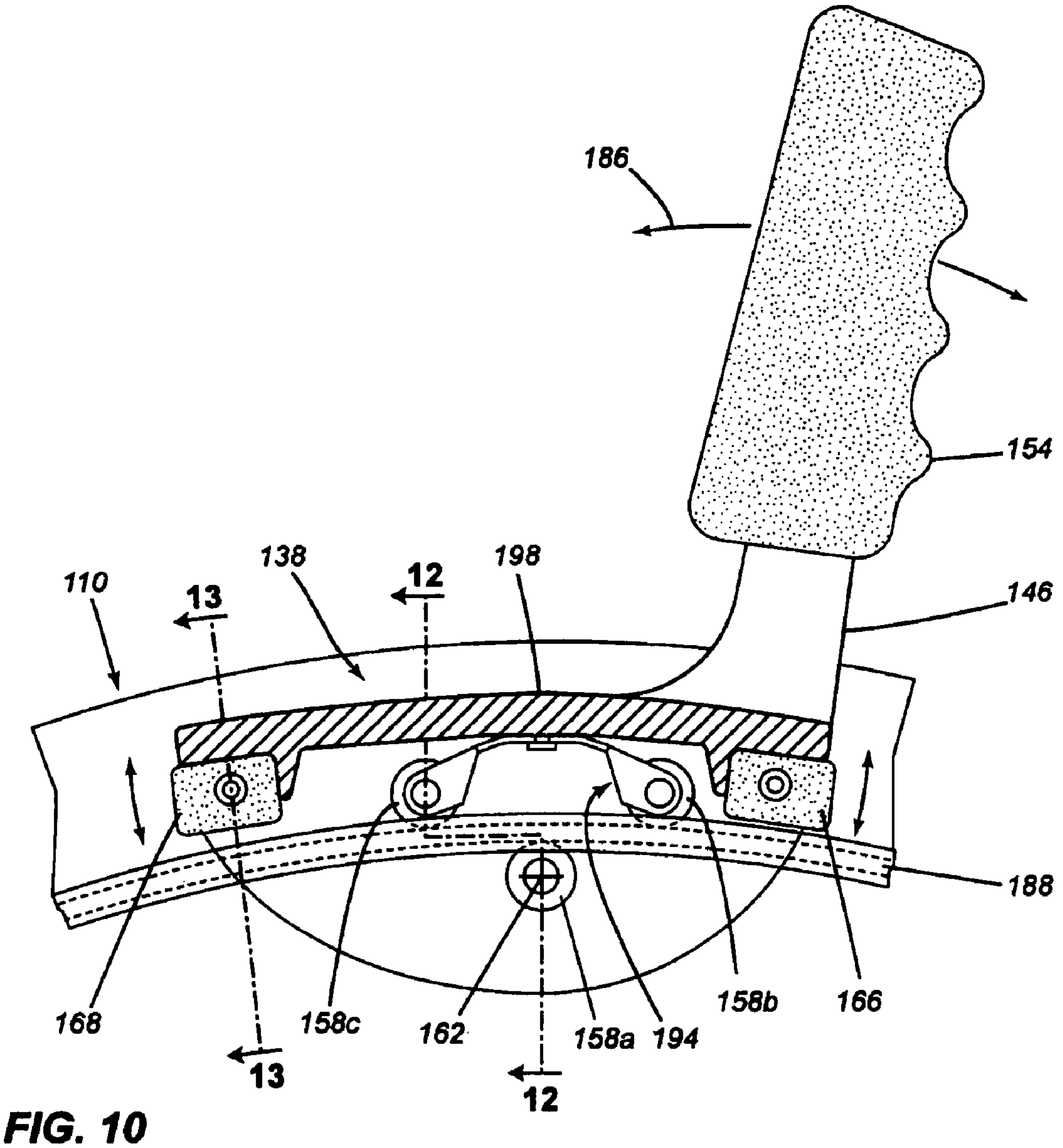
FIG. 10 is a side elevational view, partially sectioned, of the propulsion unit of FIG. 9, mounted on a fragment of the flange.
Figure 11:
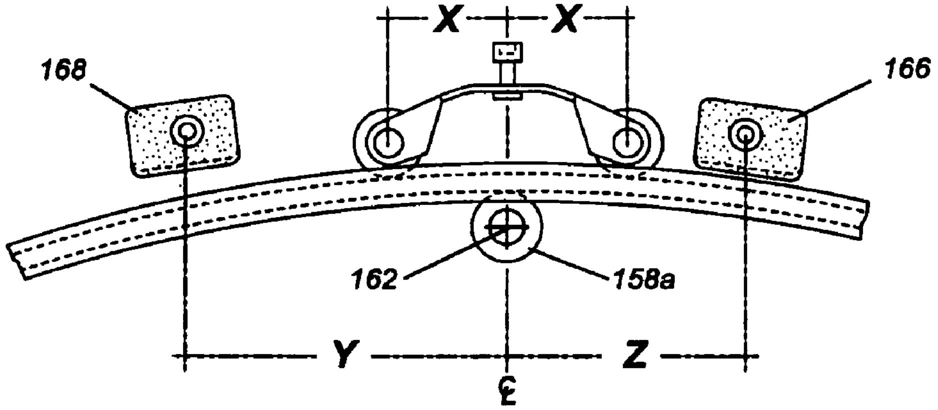
FIG. 11 is a side elevational view showing parts of the propulsion unit of FIG. 9.
Figure 12:
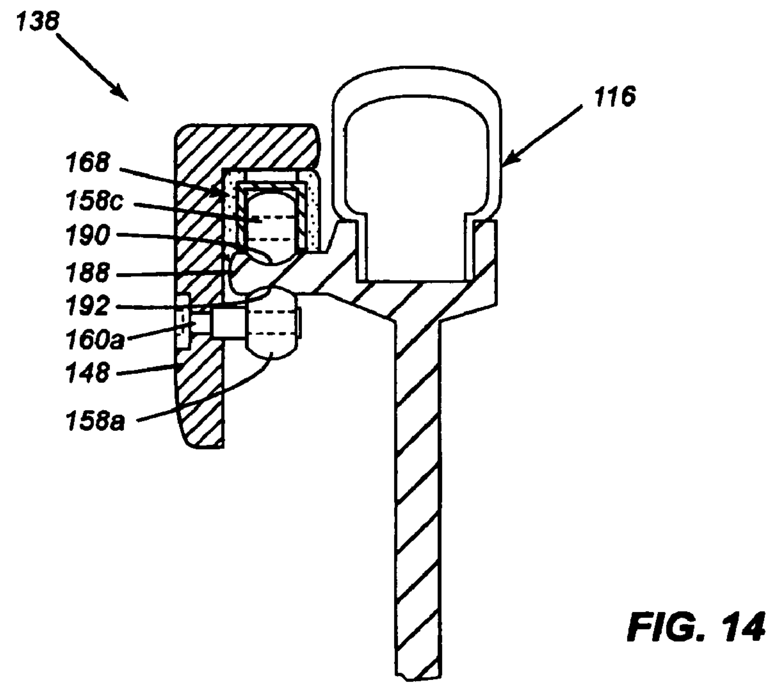
FIG. 12 is a cross-sectional view of the propulsion unit taken along lines 12-12 of FIG. 10.
Figure 14:
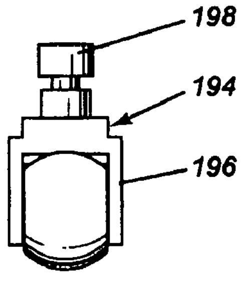
FIG. 14 is a front elevational view of a spring-loaded carriage with a roller of the propulsion unit of FIG. 9.
Figure 13:
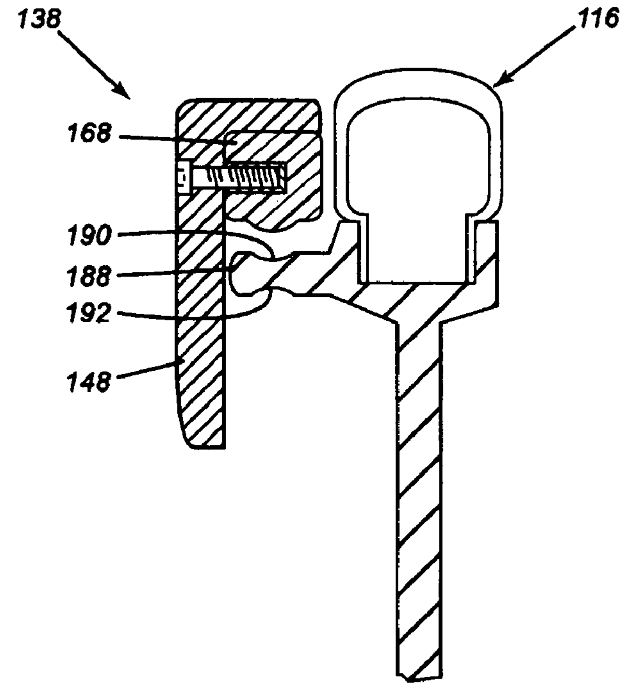
FIG. 13 is a cross-sectional view of the propulsion unit taken along lines 13-13 of FIG. 10.
Figure 15:
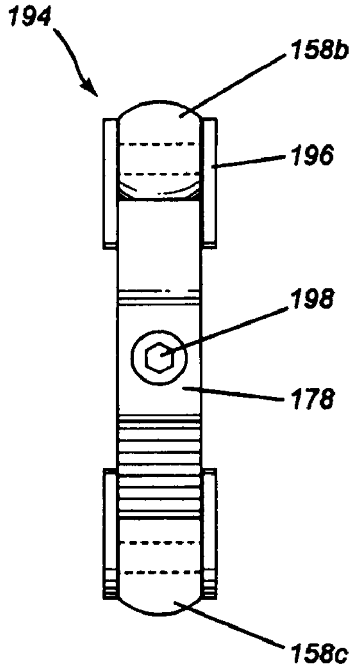
FIG. 15 is a top plan view of the spring-loaded carriage of the propulsion unit of FIG. 9.
Figure 16:
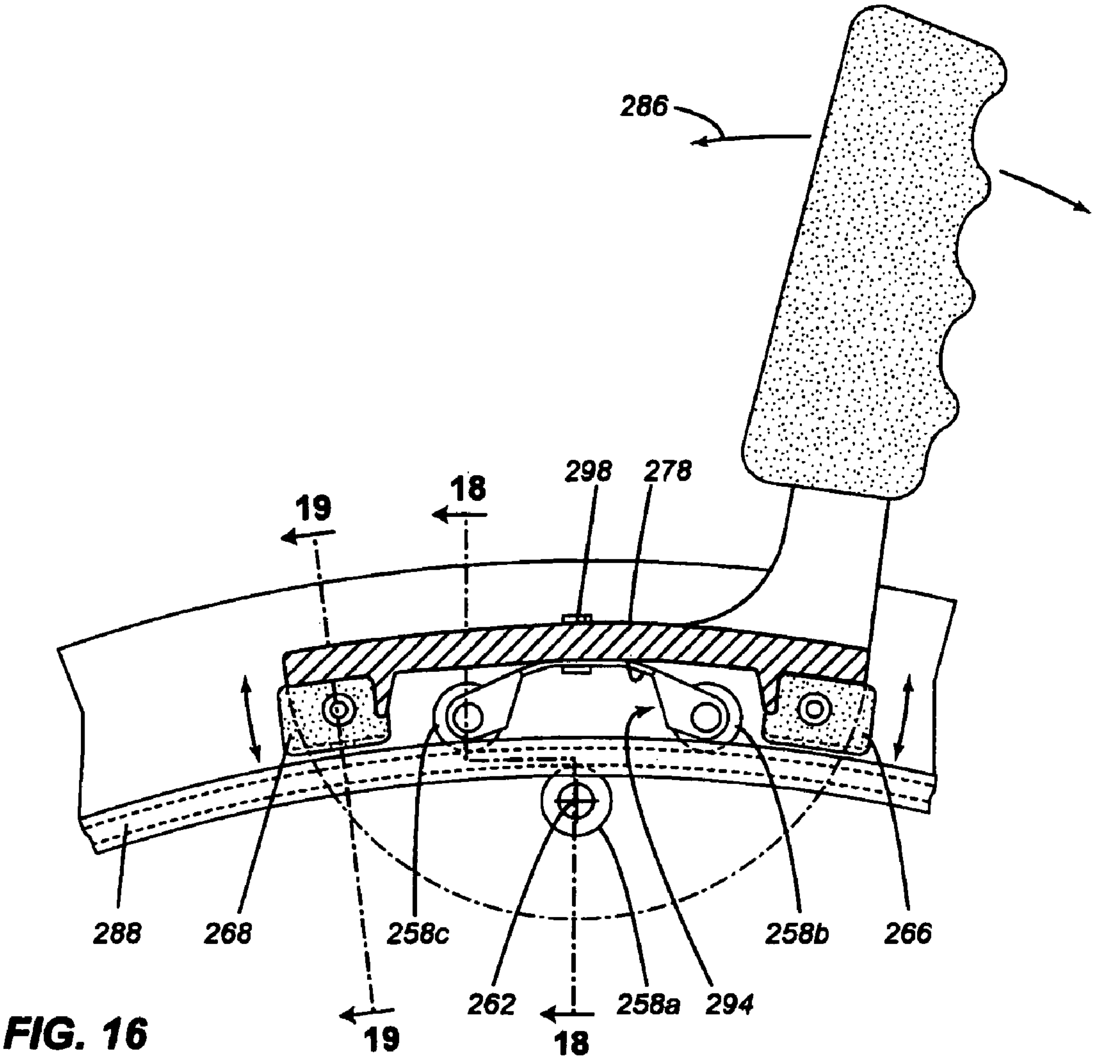
FIG. 16 is a perspective view of a propulsion unit mounted on a flange of a wheelchair in accordance with a third particular embodiment of the present invention.
Figure 17:
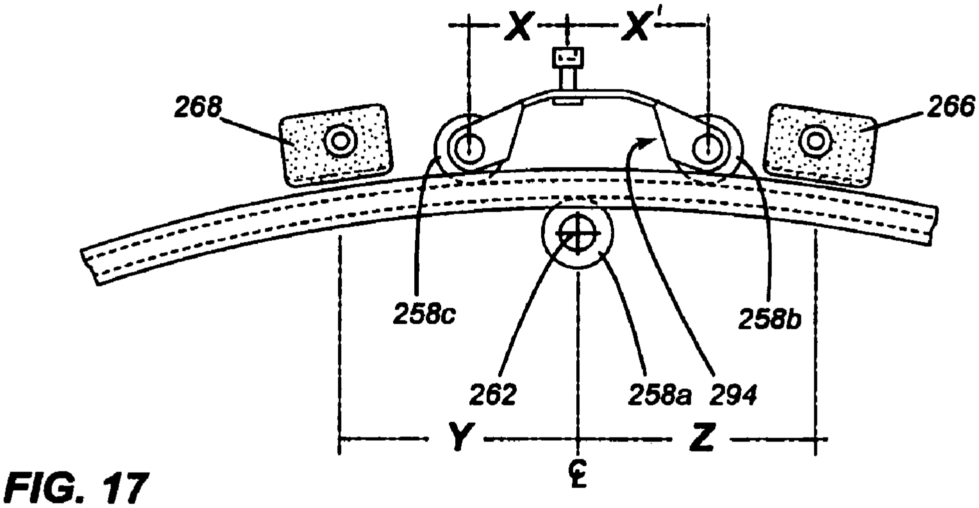
FIG. 17 is a side elevational view showing parts of the propulsion unit of FIG. 16.
Figure 18:
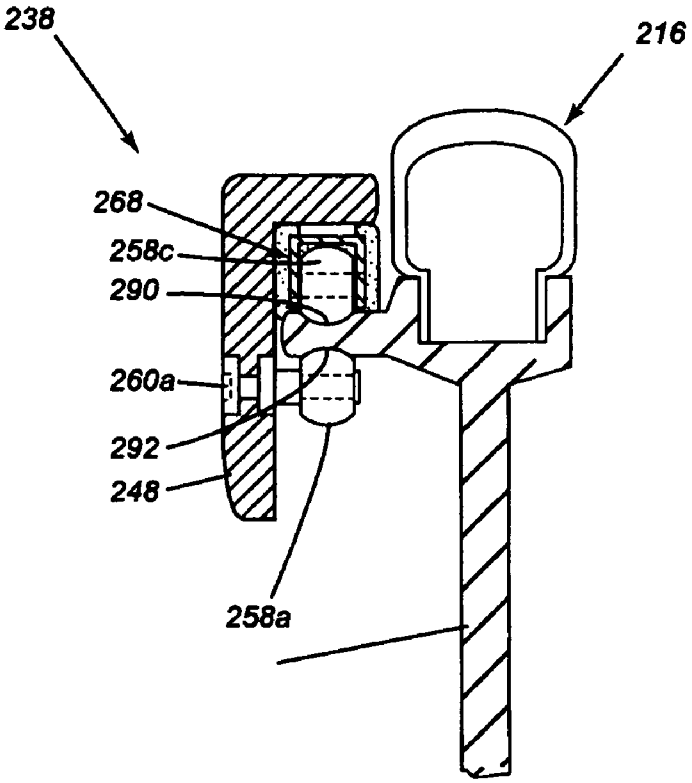
FIG. 18 is a cross-sectional view of the propulsion unit taken along lines 18-18 of FIG. 16.
Figure 19:
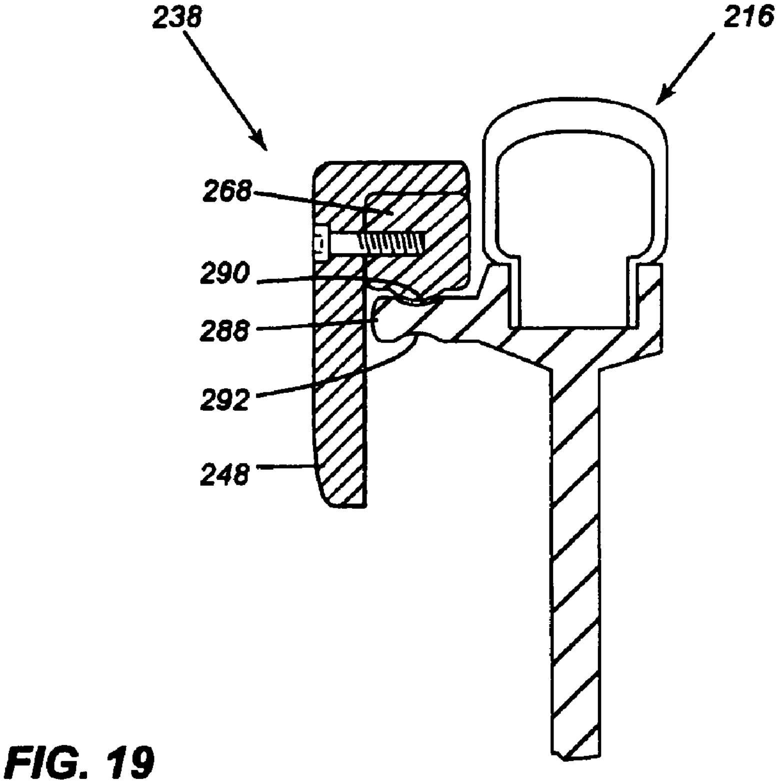
FIG. 19 is a cross-sectional view of the propulsion unit taken along lines 19-19 of FIG. 16.

Referring to FIGS. 10 and 11, it can be seen that distances X, Y and Z are similar to those of the preferred embodiment thereby yielding a similar result. The result being that less effort is required to propel the wheelchair 110 forward than rearward. Notably, the off-set of the friction element configuration causes the rear friction element 168 to be slightly further away from the flange 188 than the front friction element 116; therefore the time and effort required to engage the former with the flange 188 is greater.

Now referring to FIGS. 16 through 19, a third particular embodiment is shown. The reference numerals used for various elements in the third particular embodiment correspond to the reference numerals utilized in the first embodiment but have been raised by 200. Only the aspects of this embodiment that differ from the second particular embodiment will be described.

As shown in FIGS. 16 through 19, the third particular embodiment differs from the second particular embodiment in that the spring-loaded carriage 294, with spring 278 is not bisected. The spring-loaded carriage 294 is attached to the top portion 250 at an off-set by the rivet 298 creating a greater distance X' than X. The distance X' being defined, as before, between roller 258*b* and the fixation point of the carriage 294. With this spring biased roller configuration, the desired result of providing a propulsion unit 238 requiring less effort to propel a wheel forward than rearward is achieved. This is due to the fact that the shorter the leaf spring 278 the more rigid it is and the more difficult to cause it to flex.

Moreover, in the third particular embodiment the front and rear friction elements 266 and 268 are equally distanced from pivot point 262 such that distances Y and Z are equal.

Figure 20:
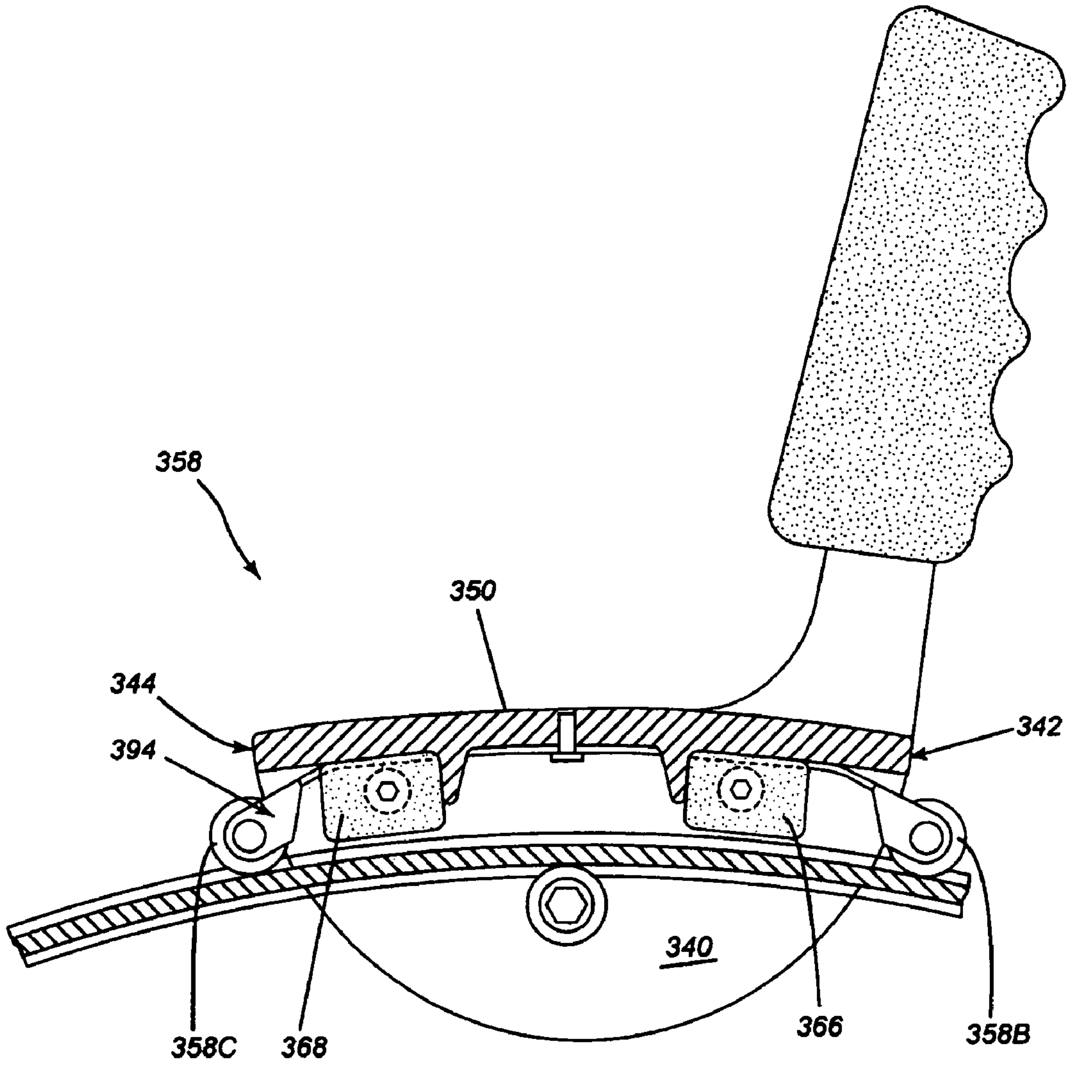
FIG. 20 is a perspective view of a propulsion unit mounted on a flange of a wheelchair in accordance with a fourth particular embodiment of the present invention.

Now referring to FIG. 20, a fourth particular embodiment is shown. The reference numerals used for various elements in the fourth particular embodiment correspond to the reference numerals utilized in the first embodiment but have been raised by 300.

In this particular embodiment, the spring-loaded carriage 394 is modified to extend the length of the top portion 350 of the propulsion unit 338. The position of the rollers 358*b* and *c* are interchanged with that of the front and rear friction elements 366 and 388. The rollers 358*b* and *c* extend beyond the front and rear portions 342 and 344 of the body 340 such that the front and rear friction elements 366 and 368 are positioned therebetween.

Now referring to FIGS. 21 to 24, a fifth particular embodiment is shown. The reference numerals used for various elements in the fifth particular embodiment correspond to the reference numerals utilized in the first embodiment but have been raised by 400.

Figure 21:
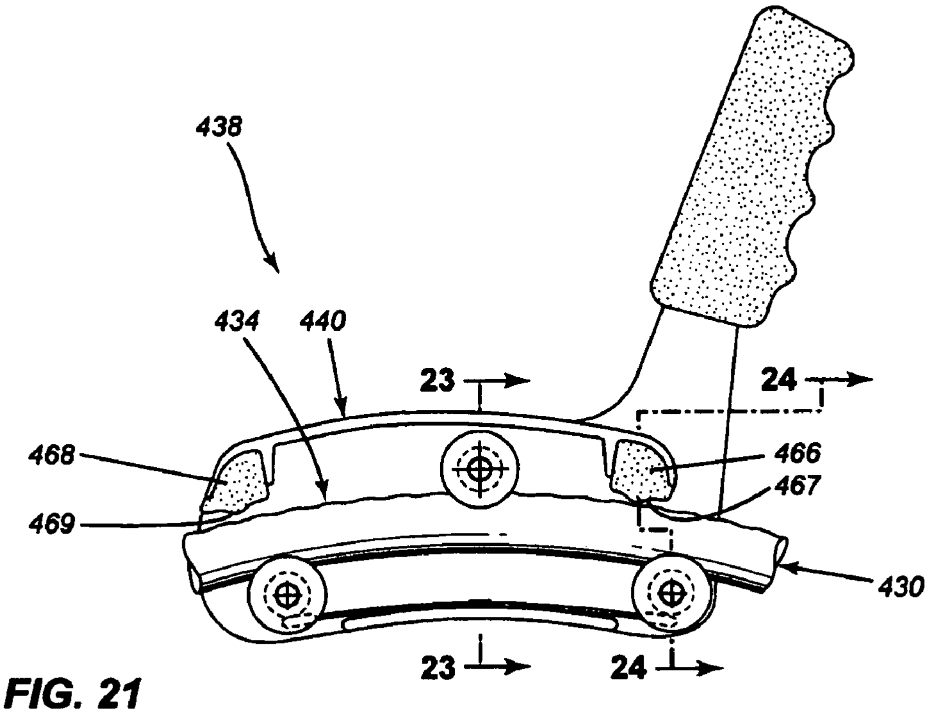
FIG. 21 is a side elevational view of a propulsion unit, mounted on a fragment of a modified handrail of a manual wheelchair in accordance with a fifth particular embodiment.
Figure 22:
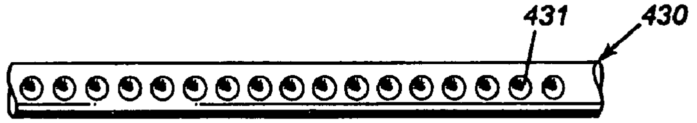
FIG. 22 is a radial view of an outer diameter of a fragment of the modified handrail of FIG. 21.

In this particular embodiment, the propulsion unit 438 comprises a mechanical grip in addition to the friction elements 466 and 468. The mechanical grip is provided as protrusions 467 and 469 on the friction elements 466 and 468 respectively and complementary indentations 431 on the outer surface 434 of the handrail 430. The protrusions 467 and 469 and indentations 431 are configured for mating engagement. The protrusions 467 and 469 extend from the friction engaging surfaces of the friction elements 466 and 468 respectively. The indentations 431 are equally spaced along the entire circumference of the outer surface 434 of the handrail 430, preferably less than half an inch apart. Therefore, when the body 440 is rocked either forward or rearward, the respective protrusion 467, 469 engages one of the indentations 431 to provide mechanical grip in addition to the frictional engagement of the respective friction element 466. 468 with the handrail 430 or track. It should be noted that when the body 440 is in the neutral position as shown in FIG. 21, the protrusion 467, 469 are spaced from the track.

Figure 23:
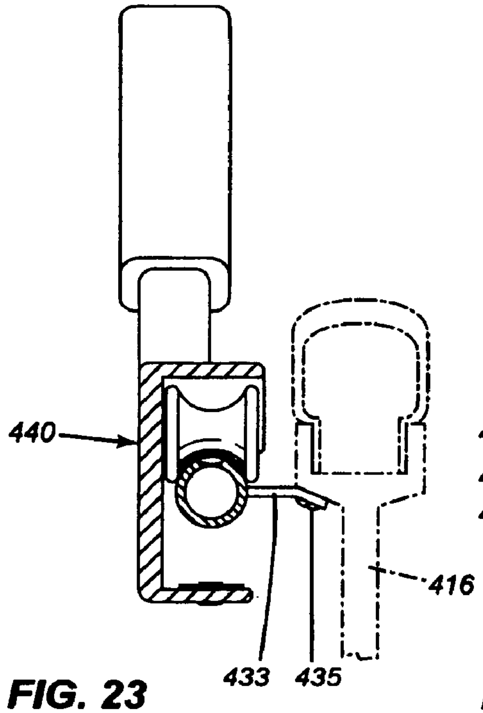
FIG. 23 is a cross-sectional view of the propulsion unit taken along lines 23-23 of FIG. 21.
Figure 24:
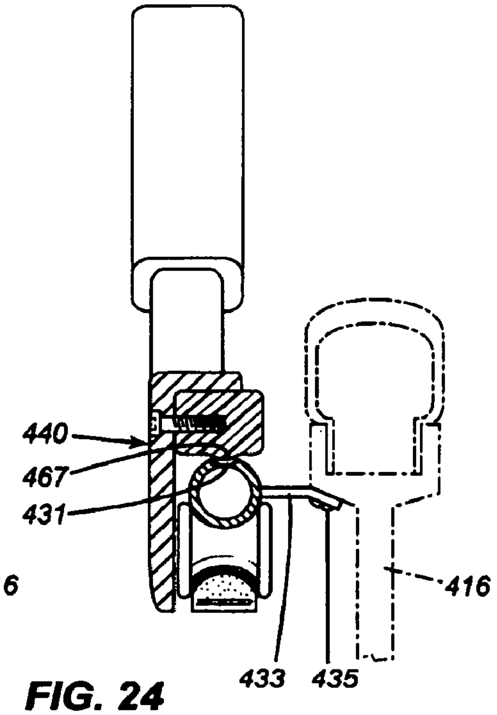
FIG. 24 is a cross-sectional view of the propulsion unit taken along lines 24-24 of FIG. 21.

Now referring concurrently to FIGS. 23 and 24, it can be seen that the handrail 430 is fixedly attached to the wheel 416 by way of a flange 433 and bolt 435. It should be understood that the handrail 430 may be the original handrail provided on a conventional manual wheelchair that has been modified or it may be a replacement for the original handrail.

Now referring to FIGS. 25 to 28, a sixth particular embodiment is shown. The reference numerals used for various elements in the sixth particular embodiment correspond to the reference numerals utilized in the first embodiment but have been raised by 500.

Figure 25:
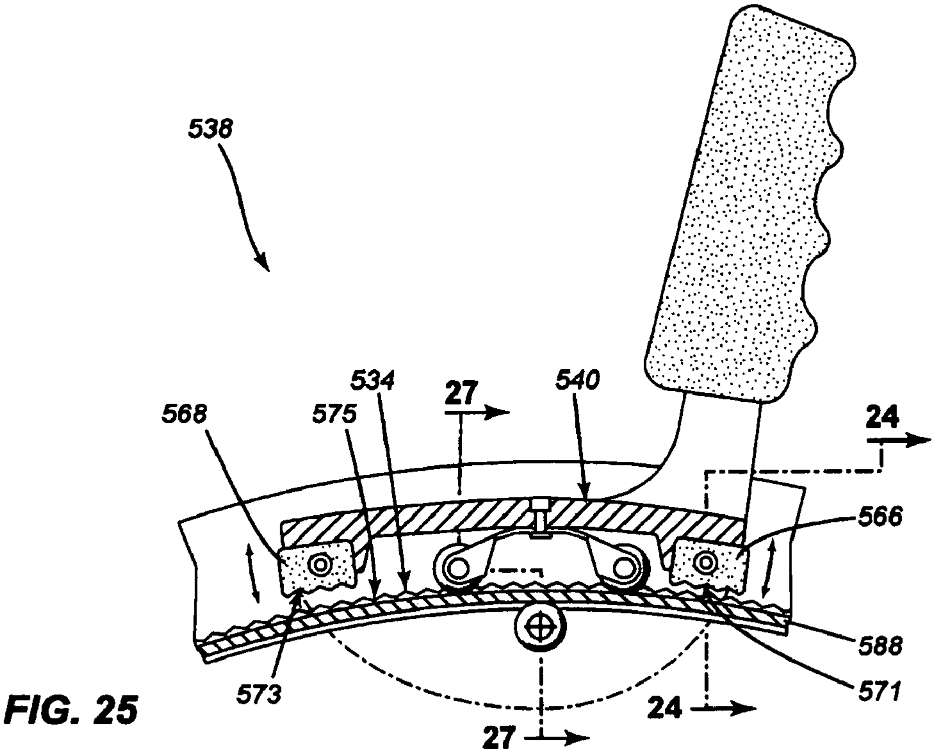
FIG. 25 is a side elevational view, partly sectioned, of a propulsion unit mounted on a fragment of a corrugated flange of a wheelchair in accordance with a sixth particular embodiment.
Figure 26:
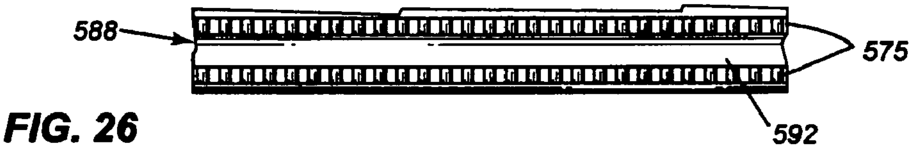
FIG. 26 is a radial view of an outer diameter of a fragment of the corrugated flange of FIG. 25.

In this particular embodiment, the propulsion unit 538 is provided with a mechanical grip differing from that of the fifth particular embodiment. The mechanical grip is provided as corrugated surfaces 571 and 573 on friction elements 566 and 568 respectively and a complementary corrugated surface 575 on the outer surface 534 of flange 588. The flange 588 acts as a track allowing for the propulsion unit 538 to roll forward or rearward along grooves 590 and 592. The corrugated surface 575 is provided as two rows of corrugations circumferentially flanking groove 592 on the outer surface 534 of the flange 588. Similarly, the corrugated surfaces 571 and 573 are provided as two spaced apart rows of corrugations on the friction engaging surfaces of the friction elements 566 and 568. Therefore, when the body 540 is rocked either forward or rearward, the respective corrugated surface 571, 573 engages the complimentary corrugated surface 575 on the track to provide mechanical grip in addition to the frictional engagement of the respective friction element 566. 568 with the flange 588 or track. It should be noted that when the body 540 is in the neutral position as shown in FIG. 25, the corrugated surface 571, 573 are spaced from the track.

Figure 27:
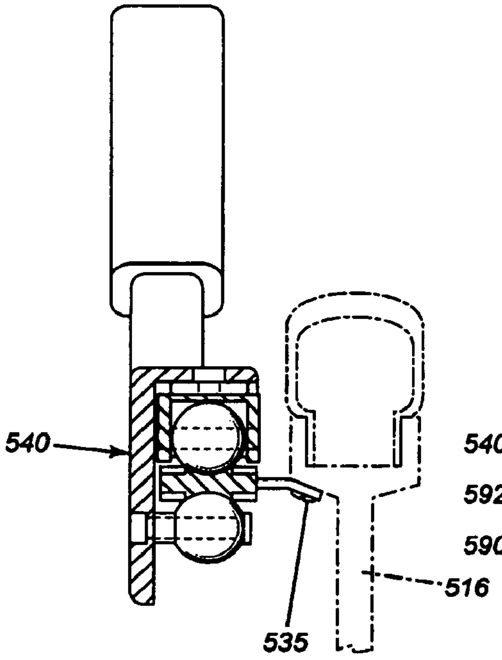
FIG. 27 is a cross-sectional view of the propulsion unit taken along lines 27-27 of FIG. 25.
Figure 28:
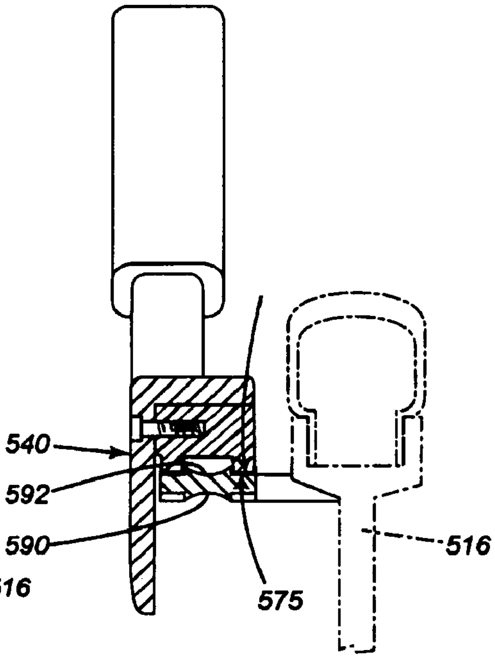
FIG. 28 is a cross-sectional view of the propulsion unit taken along lines 28-28 of FIG. 25.

Now referring concurrently to FIGS. 27 and 28, it can be seen that the flange 588 is fixedly attached to the wheel 516 by way of a bolt 535. It should be understood that the flange 588 may be a replacement for the original handrail of a conventional manual wheelchair.

Although the track has been presented as a handrail or a flange that is integrally moulded with the wheel or fixedly attached thereto in the above embodiments, it should be understood that any other member suitable for being engaged by the propulsion unit to act as a track may be used.

The mechanical grip advantageously aids in imparting the force applied to the handle to the wheel via the engagement between the propulsion unit and the track such that it prevents the friction elements from slipping. Still further, the mechanical grip has been presented as protrusions with complementary indentations and corrugated surfaces on the friction elements and on the outer surface of the track; however, it should be understood that any other suitable mechanical grip can be used that achieves the desired result.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

The invention claimed is:

1. A propulsion unit for a wheelchair wherein the wheelchair has a frame with a pair of large diameter wheels of the type having a track having an outer surface and an inner surface, the propulsion unit comprising:

a body having a front portion, a rear portion and a handle;

at least three rollers pivotally mounted to said body, two of said at least three rollers being spring biased and adapted to be mounted in contact with one of the inner and outer surfaces of the track, the remaining of said at least three rollers adapted to be mounted in contact with the other of the inner and outer surfaces of the track;

front and rear friction elements positioned in said front and rear portions of said body respectively, said front friction element adapted to engage the track when a forward pressure is applied to said handle rocking said body forward, said rear friction element adapted to engage the track when a rearward pressure is applied to said handle rocking said body rearward; and wherein when the handle is pressed forward the wheel is propelled forward and when the handle is pressed rearward the wheel is propelled rearward.

2. The propulsion unit as defined in claim 1, further comprising a linking piece having a first end attached to said propulsion unit and a second end adapted for attachment to said frame of said wheelchair to maintain said propulsion unit in an easy to reach position for a wheelchair user, said linking piece preventing said propulsion unit from rolling forward or rearward off said track.

3. The propulsion unit as defined in claim 1, wherein said spring bias is provided by a spring urging said two of said at least three rollers against the track maintaining said front and rear friction elements away from the handrail, and wherein said spring flexes when said handle is pressed forward allowing said front friction element to engage the track and when said handle is pressed rearward allowing said rear friction element to engage the handrail.

4. The propulsion unit as defined in claim 3, wherein the spring is a leaf spring.

5. The propulsion unit as defined in claim 4, wherein said spring is in contact with said two of said at least three rollers extending therebetween, said spring being in contact at a distance from the track greater than a distance from the track to a center of rotation of said two of said at least three rollers.

6. The propulsion unit as defined in claim 5, wherein said spring is fixed to said body at a fixation point thereof.

7. The propulsion unit as defined in claim 6, wherein said fixation point may be one of equidistantly spaced and off-center between said two of said at least three rollers.

8. The propulsion unit as defined in claim 1, wherein said at least three rollers are triangularly oriented.

9. The propulsion unit as defined in claim 8, wherein one of said at least three rollers is disposed in said front portion of said body, and another of said at least three rollers is disposed in said rear portion of said body.

10. The propulsion unit as defined in claim 1, wherein said body pivots about an axis of rotation of said remaining of said at least three rollers when rocked forwardly and rearwardly.

11. The propulsion unit as defined in claim 10, wherein said remaining of said at least three rollers is attached to said body by an axle bolt, said body pivoting about said axle bolt.

12. The propulsion unit as defined in claim 1, wherein said two of at least three rollers are each attached to said body by an axle bolt.

13. The propulsion unit as defined in claim 12, wherein said body defines two oblong slots, said axle bolts of said two of said at least three rollers extending through said oblong slots, and wherein said axle bolts are displaced in opposite directions in said oblong slots when pressure is applied to said handle.

14. The propulsion unit as defined in claim 1, wherein said spring bias is provided by a spring loaded carriage, said two of said at least three rollers being rotateably attached to opposite ends of said spring loaded carriage.

15. The propulsion unit as defined in claim 14, wherein said spring loaded carriage is fixed to said body at a fixation point.

16. The propulsion unit as defined in claim 15, wherein said fixation point may be one of equidistantly spaced and off-center between said two of said at least three rollers.

17. The propulsion unit as defined in claim 1, wherein said body has a side portion extending in a plane perpendicular to the wheel axis of rotation and a top portion extending perpendicular to said side portion adapted to extend over the outer surface of the track.

18. The propulsion unit as defined in claim 17, wherein said handle extends outwardly away from said top portion of said body.

19. The propulsion unit as defined in claim 17, wherein said remaining of said at least three rollers is axially fixed to said side portion by an axle bolt, said body pivoting about said axle bolt when rocked forwardly and rearwardly.

20. The propulsion unit as defined in claim 1, wherein said front and rear friction elements are provided as elastomeric pads.

21. In combination a propulsion unit and a track for a wheelchair wherein the wheelchair has a frame with a pair of large diameter wheels, said track comprising an outer surface and an inner surface and adapted to be fixed to one of said wheels and said propulsion unit grippingly engaged with said track, said propulsion unit comprising:

a body having a front portion, a rear portion and a handle;

at least three rollers pivotally mounted to said body, two of said at least three rollers being spring biased and mounted in contact with one of the inner and outer surfaces of the track, the remaining of said at least three rollers mounted in contact with the other of the inner and outer surfaces of the track;

front and rear friction elements positioned in said front and rear portions of said body respectively, said front friction elements engaging the track when a forward pressure is applied to said handle rocking said body forward, said rear friction element engaging the track when a rearward pressure is applied to said handle rocking said body rearward; and wherein when the handle is pressed forward the wheel is propelled forward and when the handle is pressed rearward the wheel is propelled rearward.

22. The combination of claim 21, wherein said track has a circular cross-section and said rollers have a concave body section for mating engagement therewith.

23. The combination of claim 21, wherein said track has a first and a second groove on said inner and outer surfaces respectively and said rollers have a convex curvature for mating with said respective grooves.

24. The combination of claim 21, wherein said track and said propulsion unit comprise a mechanical grip including complementary members defined on said track and on said propulsion unit for mating engagement to impart force that is applied to said handle to said track and from said track to said wheel.

25. The combination of claim 24, wherein said mechanical grip is provided as protrusions on said friction elements respectively and complementary indentations on said outer surface of said track.

26. The combination of claim 24, wherein said mechanical grip is provided as corrugated surfaces on said friction elements respectively and a complementary corrugated surface on said outer surface.

* * * * *

UNITED STATES PATENT AND TRADEMARK OFFICE

CERTIFICATE OF CORRECTION

PATENT NO. : 7,665,754 B2
APPLICATION NO. : 11/445366
DATED : February 23, 2010
INVENTOR(S) : Raymond Larry Mitchell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Seventh Day of December, 2010

David J. Kappos

*Director of the United States Patent and Trademark Office*